United States Patent Office 2,982,601
Patented May 2, 1961

2,982,601

SEPARATION OF URANYL AND RUTHENIUM VALUES BY THE TRIBUTYL PHOSPHATE EXTRACTION PROCESS

Archie S. Wilson, Richland, Wash., assignor to the United States of America as represented by the United States Atomic Energy Commission No Drawing. Filed Mar. 3, 1954, Ser. No. 413,970

4 Claims. (Cl. 23—14.5)

This invention deals with the separation of uranium from rare earth metal values and/or ruthenium values contained together with the uranium in aqueous solutions, and in particular with the recovery of uranium from such solutions by solvent extraction.

Many solutions obtained in the processing of uranium-containing ores, such as monazite sand, pitchblende, etc., contain considerable quantities of rare earths.

Uranium that has been subjected to bombardment with thermal neutrons also contains considerable amounts of the so-called fission products which include rare earths and ruthenium, and in processing such neutron-irradiated uranium metal for the recovery of uranium for reuse all the fission products have to be removed practically quantitatively. The preparation of the so-called dissolver solutions, which are obtained by dissolving neutron-irradiated uranium bodies in nitric acid, and their treatment for the purpose of separating plutonium, uranium and fission products are described in the copending application, Serial No. 318,072, filed by Seaborg et al. on October 31, 1952, Patent No. 2,950,166, issued August 23, 1960, for "Solvent Extraction Process."

When such dissolver solutions or similarly composed solutions are treated for plutonium recovery, for instance, by carrier precipitation with bismuth phosphate, as is described and claimed in copending application, Serial No. 478,570, filed by Thompson and Seaborg on March 9, 1943, for "Phosphate Method for Separation of Radioactive Elements," and granted as U.S. Patent No. 2,799,553 on July 16, 1957, waste solutions are obtained which contain a relatively high amount of uranium in admixture with fission products.

From all these solutions described above uranium is to be recovered in a highly purified condition. One preferred way of recovering the uranium is by extraction with an organic substantially water-immiscible solvent whereby some of the values contained in the aqueous solution are preferentially taken up by the organic solvent while other values preferentially remain in the aqueous raffinate. Normally the uranium is the element preferentially extracted while the rare earth and ruthenium values preferentially remain in the aqueous solution.

The separation by solvent extraction, however, is never complete and the procedure has to be repeated in order to accomplish quantitative separation. Separation is particularly impaired if cerium and ruthenium are present in the aqueous solution to be treated, because these two metals are coextracted with the uranium to an undesirable degree.

It is an object of this invention to provide a process for the recovery of uranium values by solvent extraction from aqueous solutions containing the uranium values together with rare earth and/or ruthenium values by which the degree of separation is increased.

It is also an object of this invention to provide a process for the recovery of rare earth metal values and/or ruthenium values from aqueous solutions containing said values together with actinide values which yields a high output.

These and other objects are accomplished by adding hydrogen peroxide to an aqueous mineral acid solution containing actinide metal values and fission product values to be separated, contacting said solution with an organic substantially water-immiscible solvent, and separating an organic extract phase containing the bulk of said actinide values from an aqueous raffinate containing the bulk of said fission product values.

The amount and concentration of hydrogen peroxide may be varied widely without impairing the operativeness of the process; of course, the minimum amount is somewhat dependent on the concentration of the solution to be treated. For an aqueous solution obtained by dissolving neutron-irradiated uranium and containing uranyl nitrate hexahydrate in a concentration between 0.1 and 0.3 M, a hydrogen peroxide concentration in the solution to be treated of between 0.3 and 0.6 M has been found satisfactory.

The extraction should be carried out from an acidic aqueous solution. While all strong mineral acids, such as nitric acid and hydrochloric acid, are suitable, nitric acid is the preferred acid. The concentration of nitric acid may vary widely. However, it was found advantageous to increase the acidity with increased concentration of hydrogen peroxide, in order to avoid precipitation of uranium peroxide. Nitric acid concentrations between 3 and 5 M were found to give satisfactory results.

While the hydrogen peroxide may be added to the solution at room temperature, it was found advantageous to subject the solution, after the addition, to a digesting step consisting of heating to a temperature between 50 and 85° C. and holding this temperature for from 2 to 3 hours. A temperature of about 50° C. was the preferred temperature.

After the digestion it is favorable, although not necessary, to destroy any excess of hydrogen peroxide. Any means known to those skilled in the art may be used for this purpose; addition of a trace of ferric ions, for instance, in the form of ferric nitrate, and heating to a temperature of about 60 to 70° C. until complete destruction of the hydrogen peroxide, gave good results.

All substantially water-immiscible solvents which contain an atom capable of donating an electron pair to a coordination bond have been found suitable for the process of this invention. Ethers, glycol ethers, esters, ketones, alcohols, alkyl phosphates, nitrohydrocarbons and alkyl sulfides are suitable; however, the preferred solvents for the process of this invention are methyl isobutyl ketone (hexone) and tributyl phosphate, the latter preferably as a solution in a diluent such as a kerosene-type petroleum fraction. In order to maintain the acidity of the aqueous solution at a constant value, it is advisable to acidify the solvent so that extraction of acid is reduced to a minimum.

After extraction it is well to subject the organic extract obtained to a scrubbing process in order to remove any rare earth and/or ruthenium values that might have been extracted into the solvent. An aqueous acid solution containing the same acid and in approximately the same concentration as the solution to be treated by the process of the invention is especially well suitable for this purpose; a soluble salt of the mineral acid is also satisfactory for preparing the scrubbing solution. The scrub solution may also contain a small amount of hydrogen peroxide, for instance in a concentration of 0.1 M, in order still furthermore to improve the degree of separation.

In the following, three examples are given of the process of this invention for the purpose of illustrating the improvement obtained therewith but without the

Example I

An aqueous solution obtained by dissolving neutron-irradiated uranium in nitric acid and being about 2 M in uranyl nitrate hexahydrate, 0.1 M in sodium dichromate and 0.3 M in nitric acid was made 0.5 M in hydrogen peroxide and heated for 2 hours at 50° C. Thereafter a trace of ferric nitrate was added and the solution was heated at 75° C. for 1½ hours whereby the excess hydrogen peroxide was destroyed. This solution and another solution identically composed but not having been subjected to the hydrogen peroxide treatment were then contacted in parallel experiments with hexone 0.5 M in nitric acid and thereafter scrubbed with an aqueous solution 1.3 M in aluminum nitrate. The flow rate of feed:solvent:scrub was 1:4:1.

The organic extract phase and the aqueous raffinate in each experiment were analyzed as to their beta- and gamma-emitting fission products contents and the decontamination factors (the ratio, feed/extract, of fission products per unit quantity of uranium) were calculated therefrom. While without the hydrogen peroxide the gamma decontamination factor was $0.61 \times 10^4$, the hydrogen peroxide treatment increased the decontamination factor to $0.95 \times 10^4$. Likewise, the beta decontamination factor in the instance without hydrogen peroxide treatment was $1.58 \times 10^4$ and in the run carried out with hydrogen peroxide according to this invention was $1.7 \times 10^4$.

Example II

An aqueous solution obtained from neutron-irradiated uranium after precipitation of plutonium by bismuth phosphate and containing uranyl nitrate hexahydrate in a concentration of 0.18 M and nitric acid in a concentration of 4.0 M was contacted with a mixture of a kerosene-type hydrocarbon containing 12.5% tributyl phosphate and the extract phase obtained thereby was then scrubbed with an aqueous 3 M nitric acid solution. The volume ratio of solvent:feed:scrub solution was 10:5:2; one extraction and three scrub steps were carried out. The operating conditions which were varied in three parallel runs and the decontamination factors obtained in each instance are compiled in the table below.

|  | Run Conditions | | |
| --- | --- | --- | --- |
|  | Control | Excess $H_2O_2$ not destroyed | Excess $H_2O_2$ destroyed |
| Initial M $H_2O_2$ in Feed | 0 | 0.3 | 0.3 |
| M $H_2O_2$ Added to Scrub | 0 | 0.1 | 0 |
| β D.F.[1] Total | $6.1 \times 10^4$ | $1.75 \times 10^5$ | $3.67 \times 10^5$ |
| γ D.F. Total | $1.07 \times 10^4$ | $3.77 \times 10^4$ | $4.72 \times 10^4$ |
| Ru D.F. Total | 5,950 | $1.09 \times 10^4$ | $1.66 \times 10^4$ |

[1] Decontamination factor.

These experiments show that the addition of hydrogen peroxide in both instances increased decontamination for beta and gamma fission products and for ruthenium.

Example III

A solution was prepared which contained rare earths, ruthenium, zirconium and niobium values in concentrations normally present in solutions obtained from neutron-irradiated uranium stored for two years and then dissolved in nitric acid. The nitric acid concentration in this synthetic feed solution was 3.1 M and the uranyl nitrate hexahydrate content was 136 grams/liter. Two parallel extraction experiments were carried out, one from the solution as it was and the other one from the solution after the addition of hydrogen peroxide in a quantity to yield a concentration of 0.3 M and heating for two hours at 50° C.

For the extraction the solution was contacted with a solution of 12.5% by volume of tributyl phosphate in a kerosene-type petroleum diluent in an extraction column and then scrubbed with an aqueous solution 2 M in nitric acid. The flow rates of feed:extractant:scrub were 2:5:1.

The organic extract phase obtained was analyzed for fission product activities. Beta, cerium, rare earth and ruthenium activities were counted through a 25 mg./cm.² gold absorber by means of a Geiger-Müller type counter at 7.5% geometry, and the zirconium, niobium and gamma activities were counted through a 1.7 g./cm.² lead absorber by means of a scintillation counter at 10% geometry. The activities thus ascertained in the organic extract of each of the two experiments are listed in the table below.

| Activities in Extract, c./m./mg. U | No $H_2O_2$ treatment | Made 0.3 M in $H_2O_2$ and heated at 50° C. for 2 hrs. |
| --- | --- | --- |
| Beta | 86 | 24 |
| Ce | 2.0 | 1.5 |
| Rare Earths | 2.6 | 1.8 |
| Ru | 77 | 20 |
| Gamma | 45 | 14 |
| Zr | 0 | 0 |
| Nb | 1.3 | 6 |

With the exception of zirconium, which was not extracted at all, and niobium, the separation was improved in all instances by the hydrogen peroxide treatment according to this invention.

While the above examples illustrate the process of this invention as applied to the recovery of uranium, it will be understood that other actinide elements may be separated and recovered as well from solutions containing them together with rare earth and/or ruthenium values.

It will also be understood that this invention is not to be limited to the details given herein but that it may be modified within the scope of the appended claims.

What is claimed is:

1. A process of separating uranyl values from ruthenium values contained in an aqueous nitric acid feed solution in which the nitric acid concentration ranges between 3 and 4 M, comprising adding hydrogen peroxide to said solution in a quantity to obtain a concentration of 0.3 M, contacting the aqueous solution with tributyl phosphate dissolved in kerosene and separating an organic tributyl phosphate phase containing said uranyl values from an aqueous raffinate containing said ruthenium values.

2. The process of claim 1 wherein the solution, after addition of hydrogen peroxide, is allowed to digest at a temperature of between 50 and 85° C. and wherein the organic extract phase is scrubbed with nitric acid of a concentration of between 2 and 3 M.

3. The process of claim 1 wherein the nitric acid concentration is 4 M, uranyl nitrate is present in the feed solution in a concentration of 1.8 M and the tributyl phosphate-kerosene solution has a tributyl phosphate concentration of 12.5 M.

4. The process of claim 2 wherein the nitric acid concentration is 3.1 M, uranyl nitrate is present in the feed solution in a concentration of 136 grams/liter, the digestion temperature is 50° C., the kerosene solution contains tributyl phosphate in a concentration of 12.5% and the nitric acid for scrubbing has a concentration of 2 M.

(References on following page)

References Cited in the file of this patent
UNITED STATES PATENTS
2,227,833   Hixson et al. _____ Jan. 7, 1941

OTHER REFERENCES

Warf et al.: Extraction of Cerium (IV) Nitrate by Butyl Phosphate, U.S. Atomic Energy Commission Document AECD-2524, declassified March 11, 1949, 10 pages.

Ellis: Recovery of Uranium From Industrial Phosphoric Acids by Solvent Extraction, U.S. Atomic Energy Commission Document DOW-81, July 14, 1952, pages 27 and 28.